Feb. 8, 1927. 1,616,502
J. McMAHON
BRAKE OF RAILWAY VEHICLES
Filed Dec. 18, 1924
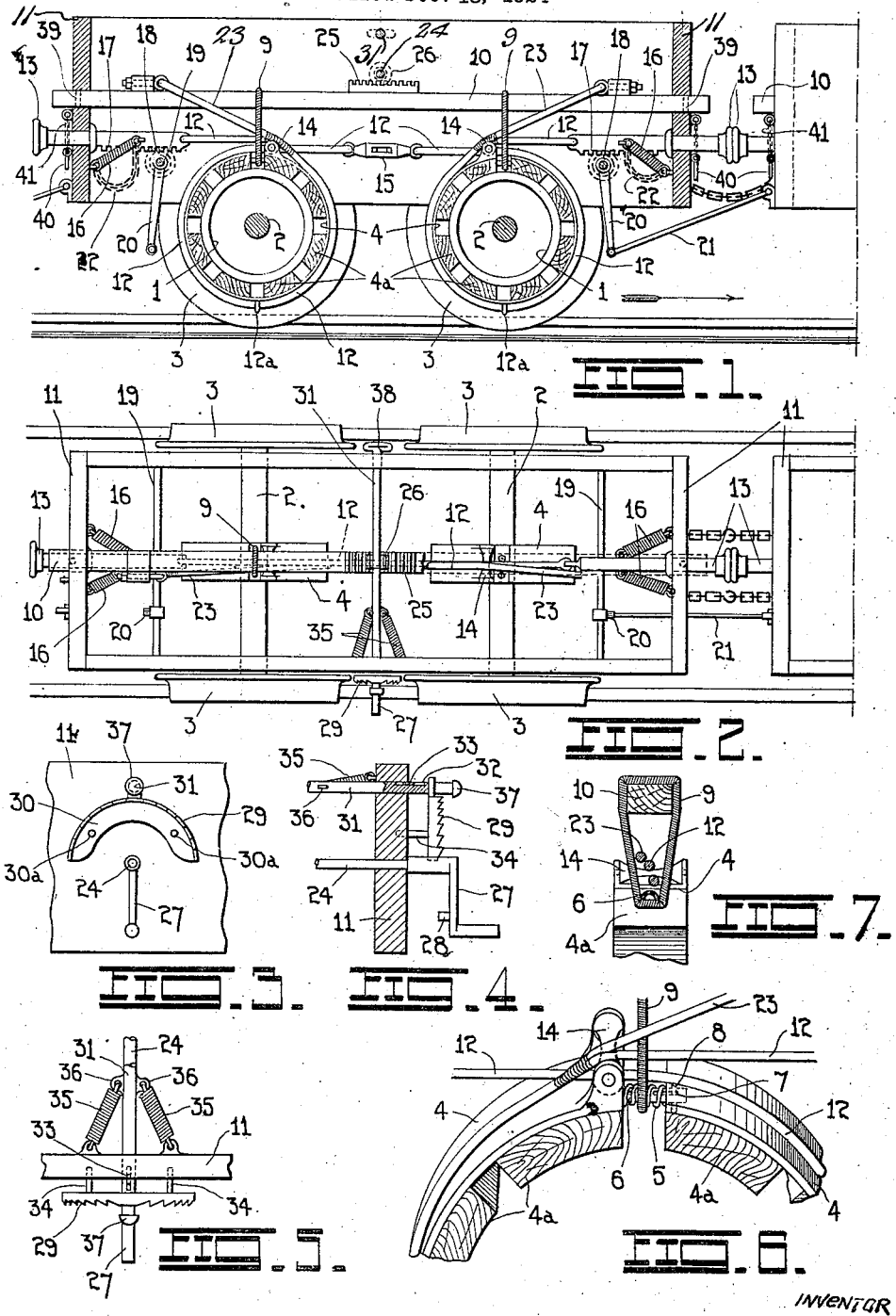
INVENTOR:
J. McMahon
By: Marks & Clerk
Attys Patented Feb. 8, 1927.

1,616,502

UNITED STATES PATENT OFFICE.

JOHN McMAHON, OF ROTOKOHU, WESTPORT, NEW ZEALAND.

BRAKE OF RAILWAY VEHICLES.

Application filed December 18, 1924. Serial No. 756,818.

This invention relates to brakes used on railway vehicles and the like, and has for its object the provision of improved braking apparatus adapted to be fitted to vehicles and to be set so that upon a string of the latter being hauled or backed the brake of each vehicle is released, and so that immediately haulage or backing ceases, each vehicle is caused to be braked, provision also being made for the manual operation of the brakes.

According to the invention brake bands, surrounding drums revolvable with the axles of the vehicle wheels, are contracted or made to grip said drums and effect the braking of the vehicles, by placing under tension a rope or chain surrounding said brake bands, and connected with a sliding bar and sliding buffers, the latter projecting from the vehicle ends.

Slacking of the rope or chain, to permit expansion of the brake bands, and the release of the drums, is permitted by movement of the sliding bar or by inward movement of the sliding buffers, the latter movement being caused either by the backing of a string of vehicles, during which time the buffers of adjacent vehicles contact with each other, or by the operation of toothed wheels gearing with racks on the buffers, during haulage of a string of vehicles, the toothed wheel at the front end of each vehicle being given turning movement at the commencement of haulage and retaining the buffer it operates in its "in" position during haulage, through a lever and a connecting rod, attached to the preceding vehicle.

The sliding bar is fitted with a rack with which meshes a pinion on a shaft provided at each side of the vehicle with a handle, through which movement in either direction can be imparted to said bar, in order to tighten the rope or chain.

Manually operated brake releasing means are also provided, said means being operable from each side of the vehicle.

In the accompanying drawing, in conjunction with which the invention will be further described;

Figure 1 is a longitudinal elevation of a vehicle fitted with the improved braking apparatus, Figure 2 is a plan view of the parts shown in Figure 1, Figure 3 is an elevation, Figure 4 a sectional elevation, and Figure 5 a part plan view, of the means for manually operating the brake, and the means for manually releasing the brake.

Figure 6 is a part perspective view of a brake band, and a rope adapted to be tightened to contract said band on a drum, and Figure 7 illustrates a brake band supporting means.

A drum 1 is fixed on and turns with each axle 2 of the vehicle running wheels 3, each drum being provided with a flexible brake band 4, fitted with blocks 4ª, or of any suitable known form, said band 4 being normally expanded under the action of a spring 5 in compression, surrounding a member 6 having an inverted U shaped cross section, and inserted in the ends of the band 4, or blocks 4ª. The member 6 contains slots 7 through which pass pins 8 for securing the member 6 in the band 4 or blocks 4ª, said slots 7 while permitting the contraction and expansion of the brake band preventing the latter from over expanding.

The weight of each brake band is borne by a loop 9 preferably of coiled spring formation, said loop 9 passing around or secured to a bar 10 slidable in the underframe 11 of the vehicle and also around a member 6 and the spring 5 thereon, so that each drum 1 is thus relieved of the weight of its brake band.

The means for tightening or contracting the brake bands 4 on the drums 1 to effect braking of the vehicle comprise a rope 12 attached at its ends to buffers 13, slidable in the end portions of the underframe 11, said rope 12 passing completely around and being attached at 12ª to each brake band 4, each of which is providel with a guide roller 14 for keeping one portion of the rope 12 clear of the other portion thereof and also clear of the springs 5.

A turnbuckle 15 or the like is provided in the rope 12 to enable the latter to be adjusted by being tightened or slackened off as may be desired.

A connection is made by a short section 23 of rope or the like from near each end of the rope 12, to the bar 10 slidable lengthways in the under frame 11, the point of attachment of each of the sections 23 to the bar 10 being located between the axle 2, the band 4 of the drum 1 on which it is intended to operate, and the nearest end of the vehicle, while the point of attachment of each section 23 to the rope 12 is on that portion of the latter which passes downwards around the brake band from the buffer 13 at the same end of the vehicle as the section 23 in question.

The bar 10 has thereon a rack 25, with which gears a toothed wheel 26 keyed on a shaft 24 extending across the under frame 11, said shaft 24 having fitted thereon at each end a handle 27 by means of which it may be turned.

One of the handles 27 is formed with a tooth 28 capable of being engaged in a rack 29 formed on a quadrant shaped plate 30 carried by a rod 31 slidable across the underframe 11, said plate being rigidly secured on the rod 31 which is prevented from turning by being formed with a keyway 32 therein, into which projects a key piece 33 rigidly secured to the underframe 11.

Additional security is given the plate 30 against turning movement by pins 34 projecting from the underframe 11, and which pass through holes 30ª and the plate 30.

The plate 30 is kept pressed outwards from the underframe 11 so as to hold the rack 29 in a position wherein the tooth 28 of the handle 27 can readily engage therewith on the latter being turned or swung upwards, by means of springs 35 in tension, the latter being attached at one end to lugs 36 on the rod 31, and at the other end to the underframe 11.

The rod 31 has at one end a push handle 37 and at the other end a loop handle 38 by either of which it may be moved to disengage the rack 29, from the tooth 28 of the handle 27, the push handle 37 being at the same side of the vehicle as the rack 29.

At each end the bar 10 contains a hole 39, in which can be inserted a pin 40 connected by a chain 41 to the vehicle.

Tension springs 16 one at each side of each buffer 13 are attached at one end to the inner ends of the buffers and at their other ends to the end portions of the frame 11, and with the sliding bar 10 positioned so that the pinion 26 is in the centre of the rack 25, said springs 16 are without tension, there being no tension on the rope 12, while the brake bands 4 are expanded by their springs 5 and do not grip the drums 1.

Each buffer 13 is provided with a rack 17 with which meshes a toothed wheel 18 loosely mounted on a shaft 19 supported across the underframe 11, said wheel 18 having secured thereto, so as to turn therewith one end of an arm 20 the latter when at the front end of the vehicle of a string of vehicles, having pivotally connected to its forward end, one end of a rod or flexible coupling 21 the other end of which is adapted to be attached to the rear end of the preceding vehicle.

With a number of vehicles coupled together and about to be hauled in the direction indicated by the arrow in Figure 1 each vehicle is first manually braked by operating a handle 27 so as to cause the pinion 26 and rack 25 to move the bar 10 rearwards or in the reverse direction, to that in which the vehicle is to travel, following which the pin 40 at the rear of the vehicle is inserted in the hole 39 in the rear end of the bar 10.

By moving the bar 10 in the direction mentioned the section 23 of rope at the rear of the vehicle is put under tension whereby the rope 12 is tightened, or all slack therein is taken up, and the brake bands 4 are caused to grip the drums 1, the section 23 of rope at the front end of the vehicle, and the springs 16 at the rear end thereof hanging loose, while the springs 16 at the front end of the vehicle are drawn taut, but are not expanded.

The coupling of the vehicles together, and their connection to each other by the rods 21, are such that on commencing to haul a string of stationary vehicles on each of which the brake bands 4 are gripping the drums 1, as aforesaid, each rod 21 is pulled forwards by the preceding vehicle before the draught is transmitted by the usual couplings between the vehicles, to the following vehicle, with the result that the toothed wheel 18 at the front end of each vehicle is operated to draw or move inwards the front buffer 13 of said vehicle and thus slacken the rope 12 and permit expansion of the brake bands 4 under the action of the springs 5 before the vehicle commences to move forward, the rods 21 being kept pulled forward and the rope 12 kept slack, as long as draught is maintained on the vehicles.

As soon as actual draught or haulage of the vehicle ceases, the front springs 16 which were expanded by the inward movement of the front buffers 13 assert themselves or contract and force said buffers 13 outwards causing the ropes 12 to be again tightened, and the brake bands 4 to again grip the drums 1 and so brake the vehicles.

Upon commencing to back a string of vehicles, the buffers 13 of adjacent vehicles come into contact with each other and are pushed inwards, causing the ropes 12 to slacken thereby permitting the brake bands 4 to expand and release the drums, the buffers being kept in their "in" positions as long as back pressure is applied by one vehicle to another.

Chains 22 are provided between the innner ends of the buffers 13 and the under-frame 11, to limit inward movement of the buffers and prevent straining of the springs 16.

To release the brake by hand, the rod 31 is operated either by pushing the handle 37, or by pulling the handle 38, in order to cause the rack 29 to move inwards and become disengaged from the tooth 28 of the handle 27 at the same side of the vehicle as said rack, whereupon the springs 16 and 5, return the bar 10, rope 12 and brake bands 4, to their neutral positions.

That I do claim and desire to obtain by Letters Patent of the United States of America is:—

1. Vehicle braking means comprising drums revoluble with the vehicle axles, brake bands mounted on the drum, members at the ends of the vehicle; a rope encircling said bands and having its ends connected to said members, a sliding bar connected to said rope; hand operated means for imparting movement to said bar, in order to tighten the rope, and effect braking of the vehicle; and means for retaining said bar in its brake applying position.

2. Vehicle braking means comprising drums revoluble with the vehicle axles, brake bands mounted on the drum, a rope encircling said bands, sliding members at the ends of the vehicles and to which the rope ends are connected; springs normally forcing said sliding members outwards; a sliding bar connected to said rope; hand operated means for imparting movement to said bar in order to tighten the rope and effect the braking of the vehicle; and means for retaining said bar in its brake applying position.

3. Vehicle braking means, according to claim 2, wherein the sliding members are provided with racks, toothed wheels meshing with said racks and provided with arms, and a flexible connection between the arm at the front of the vehicle and the preceding vehicle so that forward movement of the latter causes the front sliding member to be moved inwards against the action of the springs connected thereto and so slacken the rope, and allow the brake bands to release their grip of the drums.

4. Vehicle braking means, according to claim 2, wherein the sliding end members, project from the vehicle at each end, so that upon a string of vehicles being backed, said end members contact with each other, and are forced inwards against the action of their springs, thereby slacking the rope, and allowing the brake bands, to release their grip of the drums.

5. Vehicle braking means according to claim 1 wherein the means for operating the sliding bar, consist of a rack on said bar, a cross shaft; the pinion or a cross shaft meshing with said rack, and handles on said cross shaft.

6. Vehicle braking means according to claim 1 wherein a rack is provided on said sliding bar; a cross shaft, a pinion on said cross shaft meshing with said rack; a handle at each end of said shaft; a cross rod movable endways through the vehicle underframe and prevented from turning therein; a handle at each end of the cross rod; another rack carried with the cross rod, a tooth on one end of the pinion shaft and engageable with the last mentioned rack, operating handles; and springs acting on said cross rod for normally holding the rack thereon in position for engagement with the handle with the tooth thereon.

7. Vehicle braking means, according to claim 1, wherein short sections of rope are provided for connecting the sliding bar with the rope encircling the brake bands.

8. Vehicle braking means, according to claims 1, wherein the sliding bar, is provided at its ends with holes and pins engageable with the holes.

9. Vehicle braking means according to claim 1, wherein slotted members are provided for connecting the ends of the brake bands and springs placed on said slotted members for normally expanding said brake bands.

10. Vehicle braking means, according to claim 1, wherein guide rollers are mounted on the brake bands for the rope and wherein hooked members are suspended from said sliding bar for supporting said brake bands.

In testimony whereof I have affixed my signature.

JOHN McMAHON.